UNITED STATES PATENT OFFICE.

LÉON NONNET, OF BRUSSELS, BELGIUM.

PROCESS OF STABILIZING BISULFITES.

1,087,547. Specification of Letters Patent. Patented Feb. 17, 1914.

No Drawing. Application filed June 13, 1913. Serial No. 773,513.

*To all whom it may concern:*

Be it known that I, LÉON NONNET, a subject of the King of Belgium, residing at 224 Rue du Trone, Brussels, in the Kingdom of Belgium, have invented certain new and useful Improvements in Processes of Stabilizing Bisulfites, of which the following is a specification.

It is known that sulfurous acid gas is generally used as a disinfecting agent and as a regulator for fermentation in the wine and beer industries. The procedure is generally as follows:—An alkali metal bisulfite is dissolved either in water or in the must and in dissolving this bisulfite, liberates sulfurous acid. In order to effect the complete decomposition of the bisulfite and the liberation of all the sulfurous acid contained therein, a bisulfate is used conjointly with the bisulfite. These two salts may be mixed at the time they are used and by suitably proportioning the mixed quantities solutions containing a predetermined percentage of sulfurous acid and appropriate for their ultimate use can be obtained. This method, however, necessitates manipulations which it is the object of the present invention to eliminate, by permitting of the formation of stable mixtures of bisulfite and bisulfate such mixtures being impervious to moisture and capable of being kept for a long time without alteration. To this end both salts are separately prepared in granulated form and are subsequently mixed in the desired proportions; they may be kept in a closed vessel, as long as it is desired without any alteration.

The granules of bisulfate of soda or of potash are obtained by operation (in the known manner) with sulfuric acid on the corresponding neutral sulfate but the treatment has to be effected in such a manner that the resultant acid sulfate is completely anhydrous and does not contain any excess in sulfuric acid. This melted bisulfate is cast in plates which are very hard and are broken into small fragments or granules; the latter are subsequently rolled in bicarbonate of soda in order to remove any traces of free sulfuric acid from their surfaces.

In order to obtain granules of bisulfite capable of being kept without alteration, in contact with granules of bisulfate, the bisulfite is mixed with an equal quantity of thiosulfate of soda melted in its water of crystallization. This mixture when cast and cooled is a hard substance capable of being pulverized and, impervious to moisture, which is then broken into small fragments or granules. The granules of the two salts thus obtained may be mixed and kept in a closed vessel without their intimate contact producing a double decomposition.

To better insure the stability of the bisulfite, the hyposulfite, with which it is mixed, may have a small quantity of gum arabic added thereto, the effect of which being well known. This addition, however, is optional.

As the volume of the sulfurous gas liberated when the mixture of granules is dissolved in water, is always proportional to the quantity of salts used, it is easy to obtain solutions containing a predetermined percentage. The grains may be colored, without being affected thereby, with a trace of trinitrophenol or methylene blue.

What I claim and desire to secure by Letters Patent of the United States is:—

1. A method of obtaining granules of bisulfite capable of being kept without alteration in contact with granules of bisulfate, wherein the bisulfite is mixed with an alkali metal thiosulfate melted in its water of crystallization and the mixture is cast in a hard mass which is transformed into granules.

2. A method of obtaining granules of bisulfite capable of being kept without alteration in contact with granules of bisulfate, wherein the bisulfite is mixed with thiosulfate of soda melted in its water crystallization and the mixture is cast in a hard mass which is transformed into granules.

3. A method of obtaining granules of bisulfite capable of being kept without alteration in contact with granules of bisulfate, wherein the bisulfite is mixed with thiosulfate of soda melted in its water of crystallization and having a small quantity of gum arabic added thereto and the mixture is cast in a hard mass which is transformed into granules.

In testimony whereof I affix my signature in presence of two witnesses.

LÉON NONNET.

Witnesses:
ADOLPHE VOGEL,
LEON PIÉRARD.